F. M. RUSSELL & A. J. JUNG.
MECHANISM FOR INDICATING AND RECORDING THE MOVEMENTS OF SHIPS' HELMS.
APPLICATION FILED MAY 28, 1909.

941,955.  Patented Nov. 30, 1909.
8 SHEETS—SHEET 1.

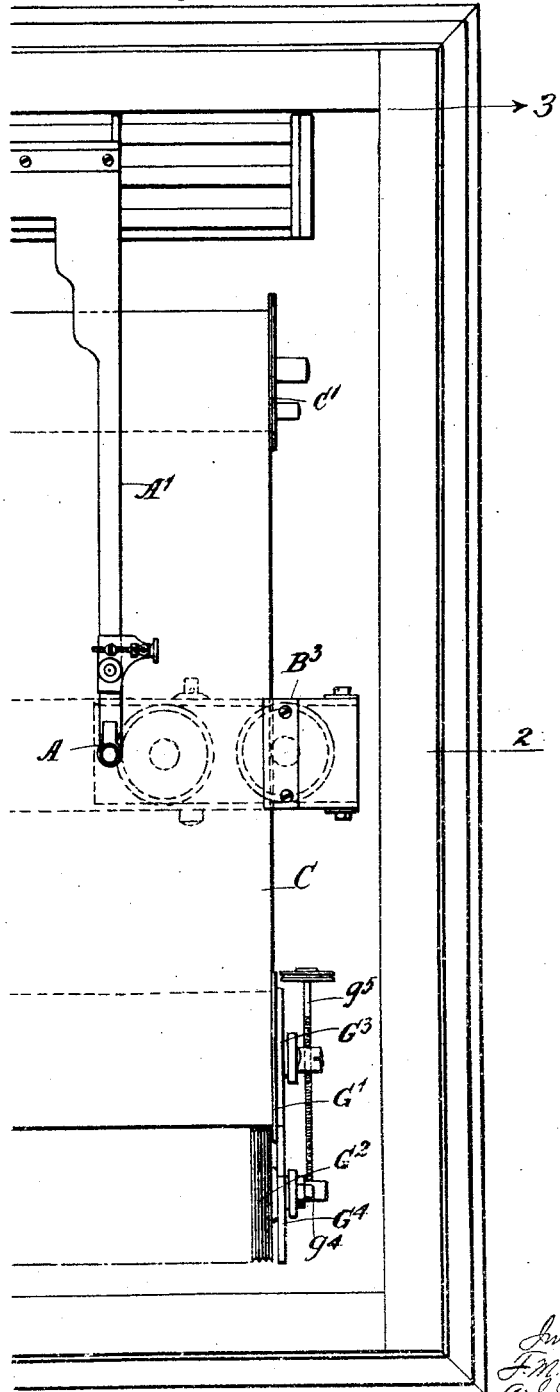

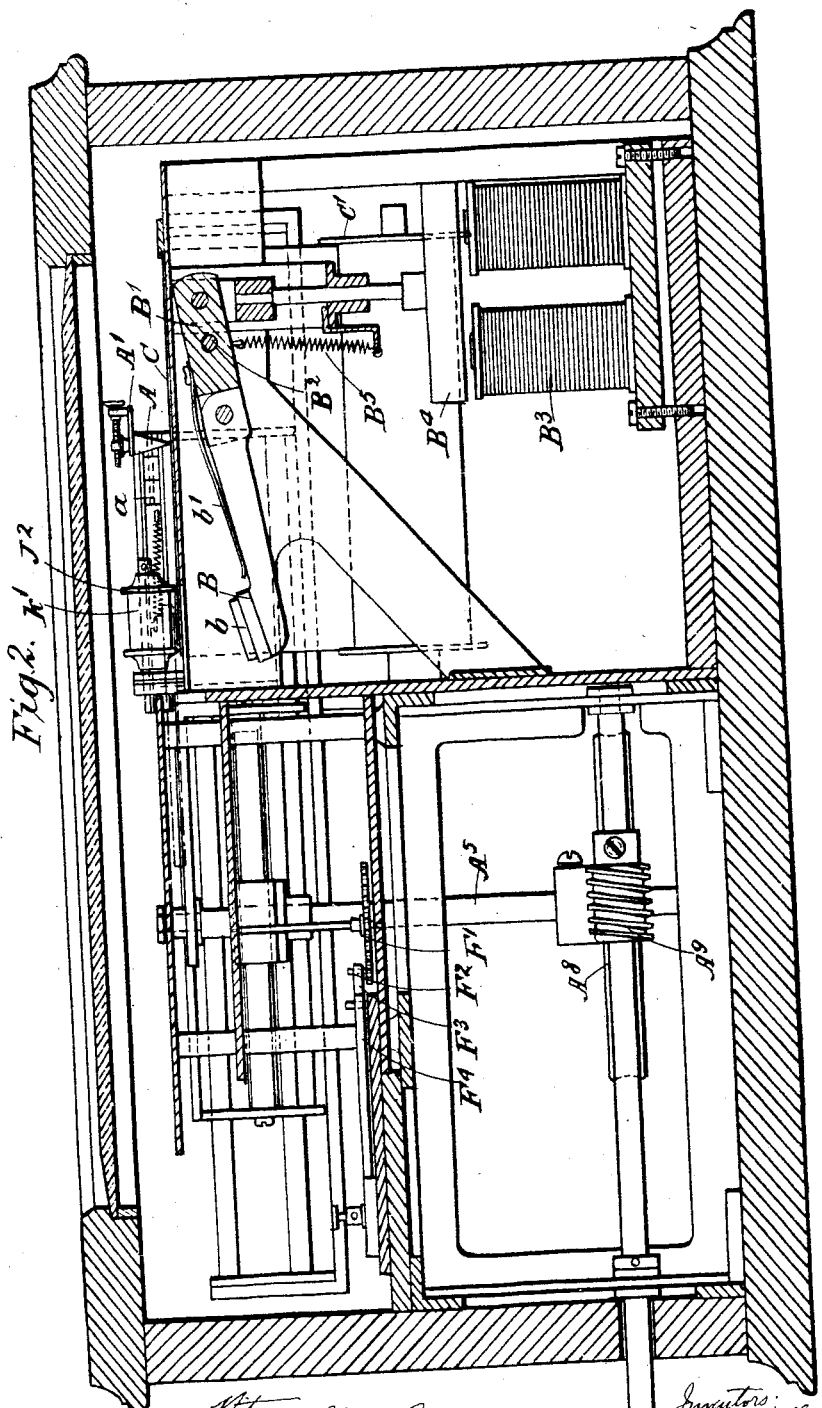

F. M. RUSSELL & A. J. JUNG.
MECHANISM FOR INDICATING AND RECORDING THE MOVEMENTS OF SHIPS' HELMS.
APPLICATION FILED MAY 28, 1909.
941,955.
Patented Nov. 30, 1909.
8 SHEETS—SHEET 4.
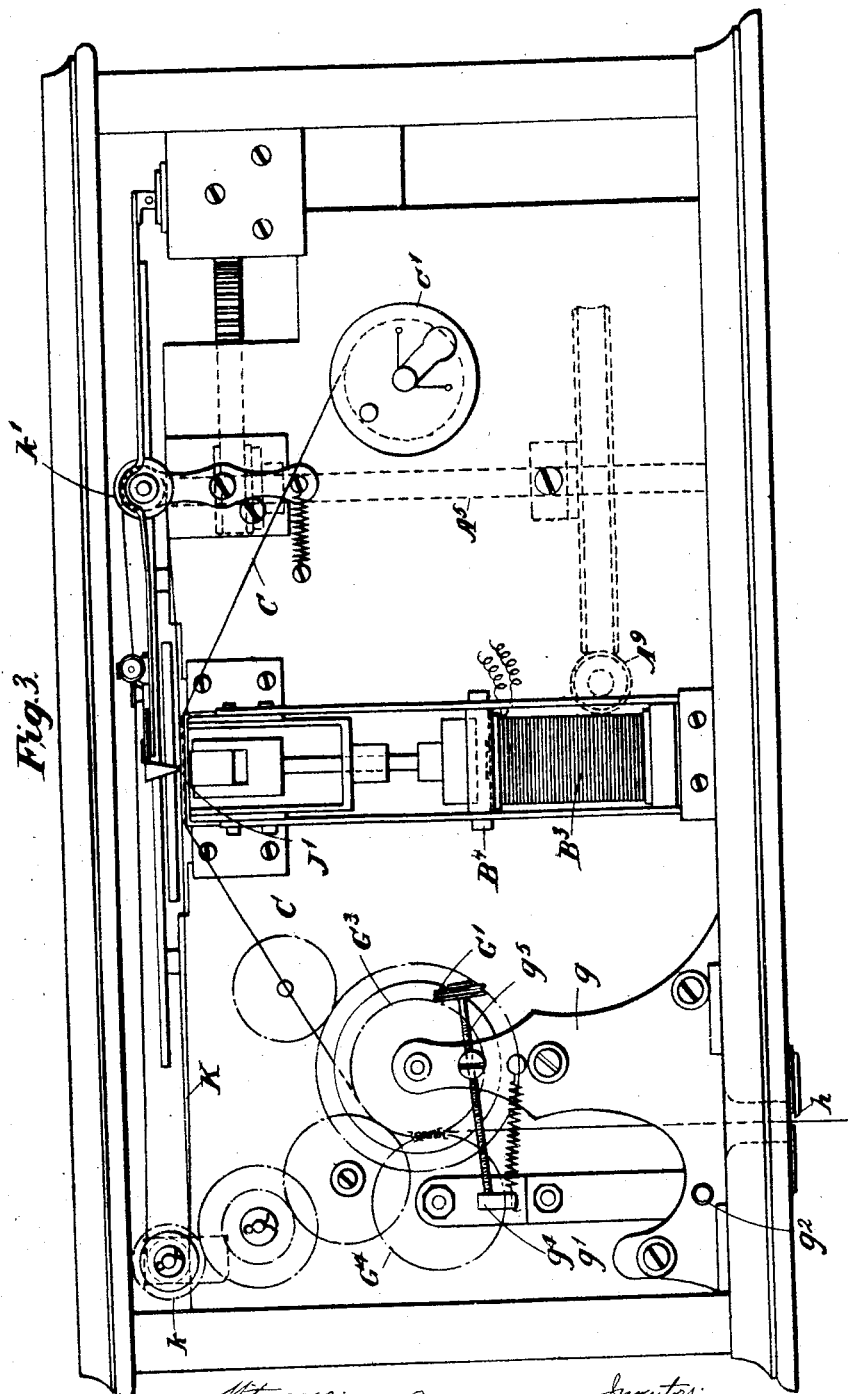

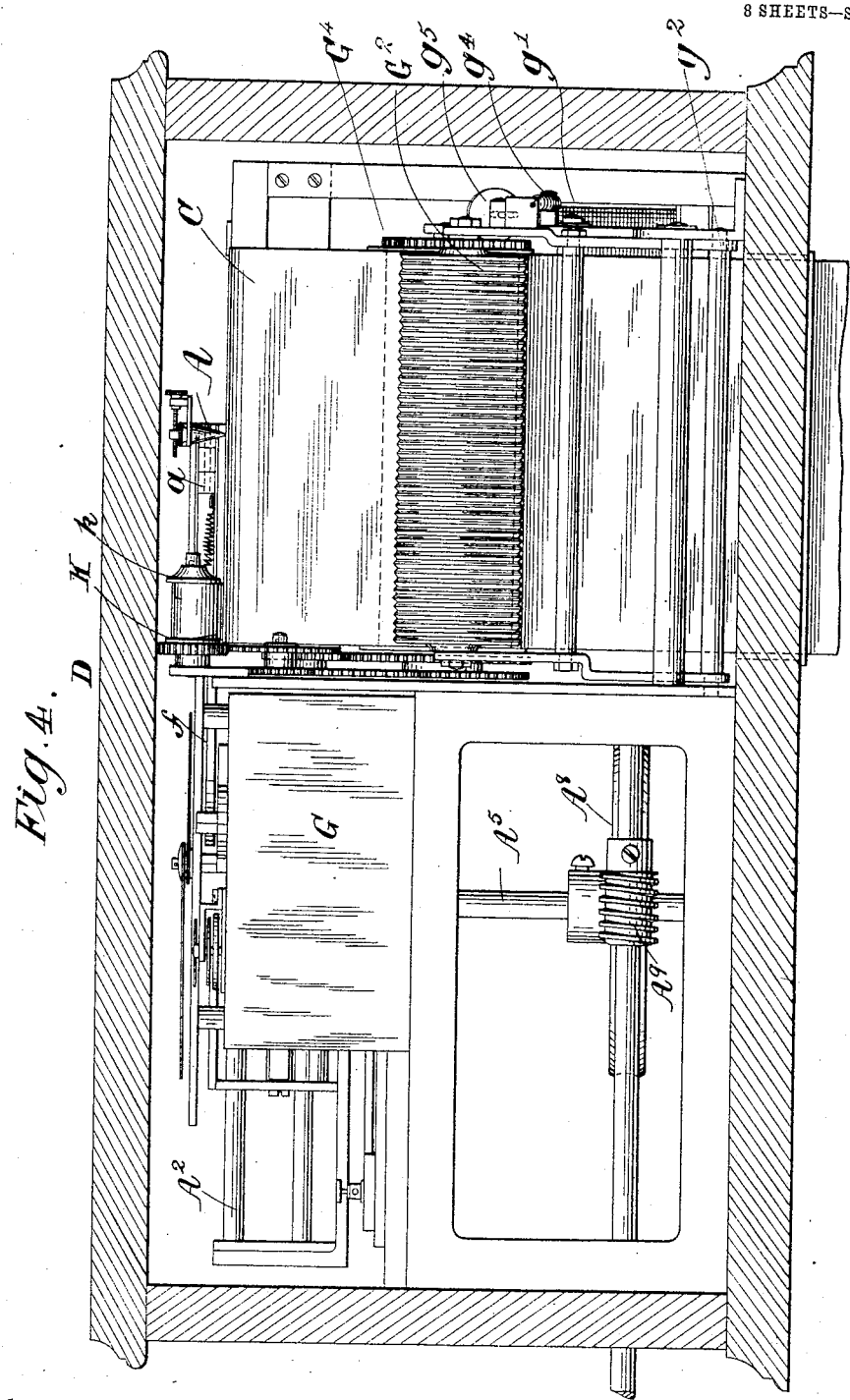

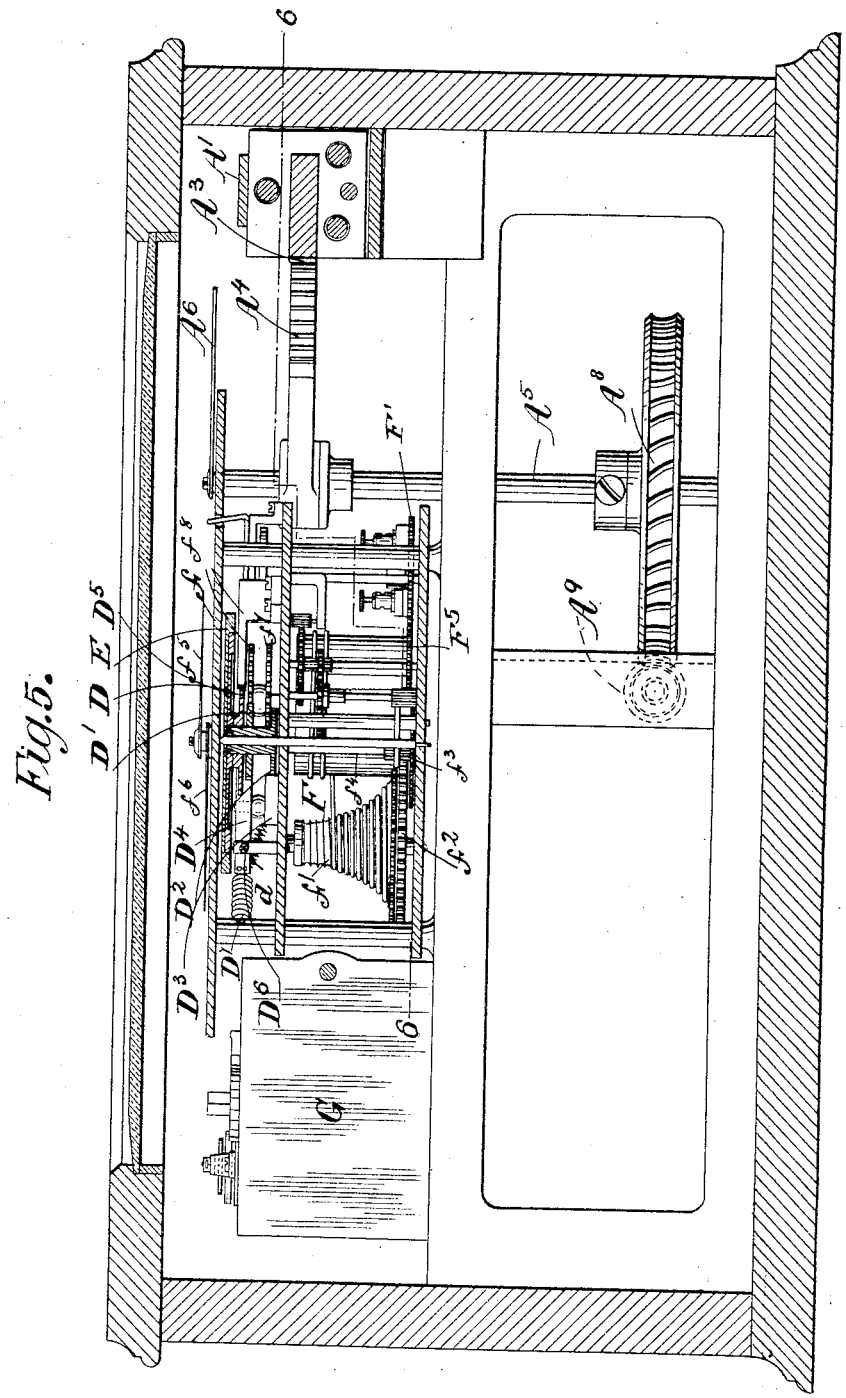

F. M. RUSSELL & A. J. JUNG.
MECHANISM FOR INDICATING AND RECORDING THE MOVEMENTS OF SHIPS' HELMS.
APPLICATION FILED MAY 28, 1909.
941,955.
Patented Nov. 30, 1909.
8 SHEETS—SHEET 7.
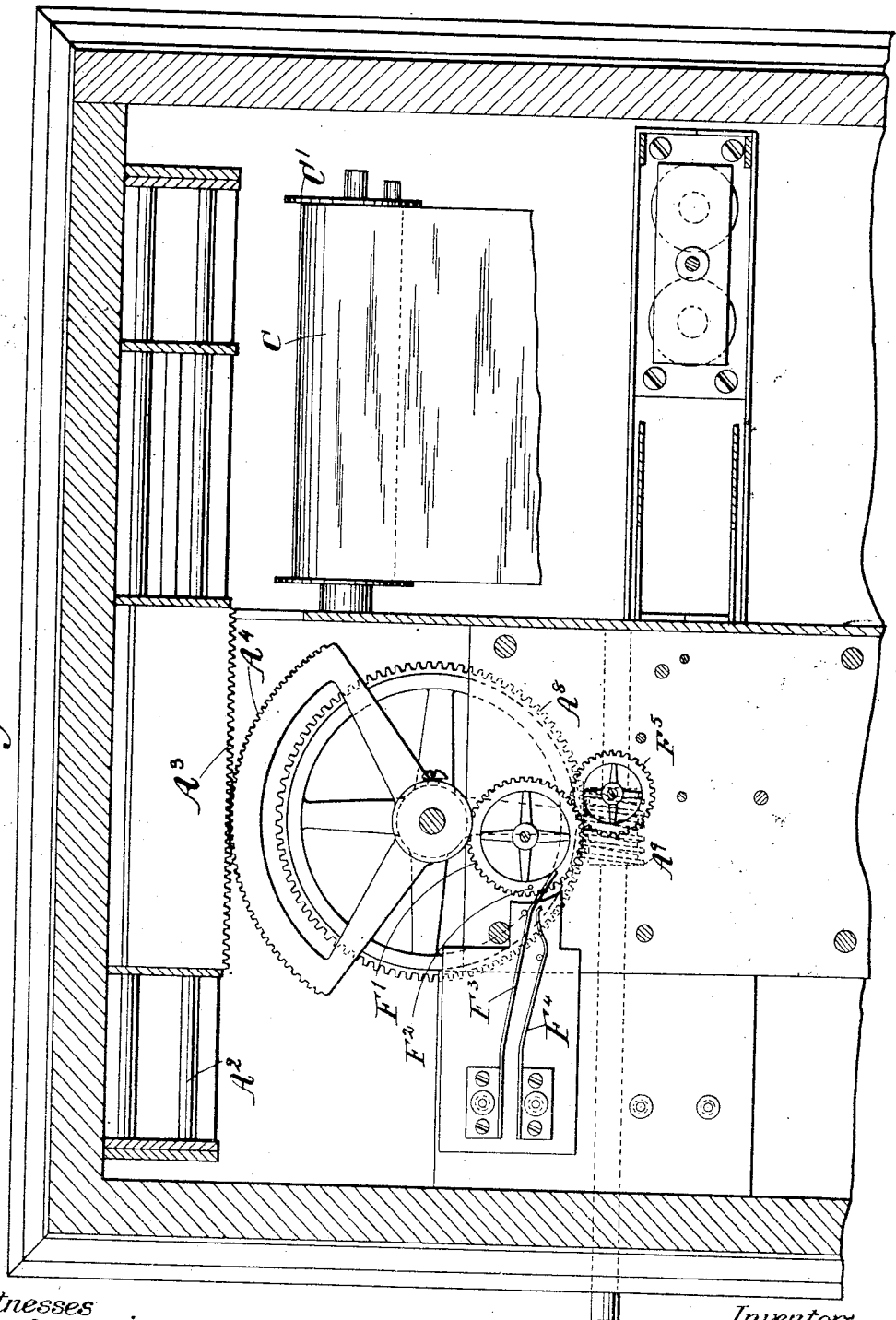

UNITED STATES PATENT OFFICE.

FREDERIC M. RUSSELL AND ALFRED J. JUNG, OF LONDON, ENGLAND.

MECHANISM FOR INDICATING AND RECORDING THE MOVEMENTS OF SHIPS' HELMS.

941,955.  Specification of Letters Patent.  Patented Nov. 30, 1909.

Application filed May 28, 1909. Serial No. 498,967.

*To all whom it may concern:*

Be it known that we, FREDERIC M. RUSSELL and ALFRED J. JUNG, subjects of the King of Great Britain, residing at Willisden, London, England, have invented certain new and useful Improvements in Mechanism for Indicating and Recording the Movement of Ships' Helms, of which the following is a specification.

This invention relates to machines or apparatus for graphically representing upon a conveniently disposed record sheet or strip the movements and the extent and direction of the movements of a ship's helm or rudder to which the apparatus is connected, together with the time exactly or approximately at which any such movements take place and also the duration of time of the movement so that a precise and easily read record of the movements of the helm is always obtainable.

According to the present invention the movements of a ship's helm to port or starboard are recorded by a pen or stylus connected to a moving member of the steering gear and which bears upon a constantly moving record strip upon which a time recording clock or instrument periodically stamps or prints the time, such printing being effected independently of the movements of the pen.

To these ends the invention consists in the novel constructions, arrangement and operation of the mechanism hereinafter described and claimed.

Figure 1:
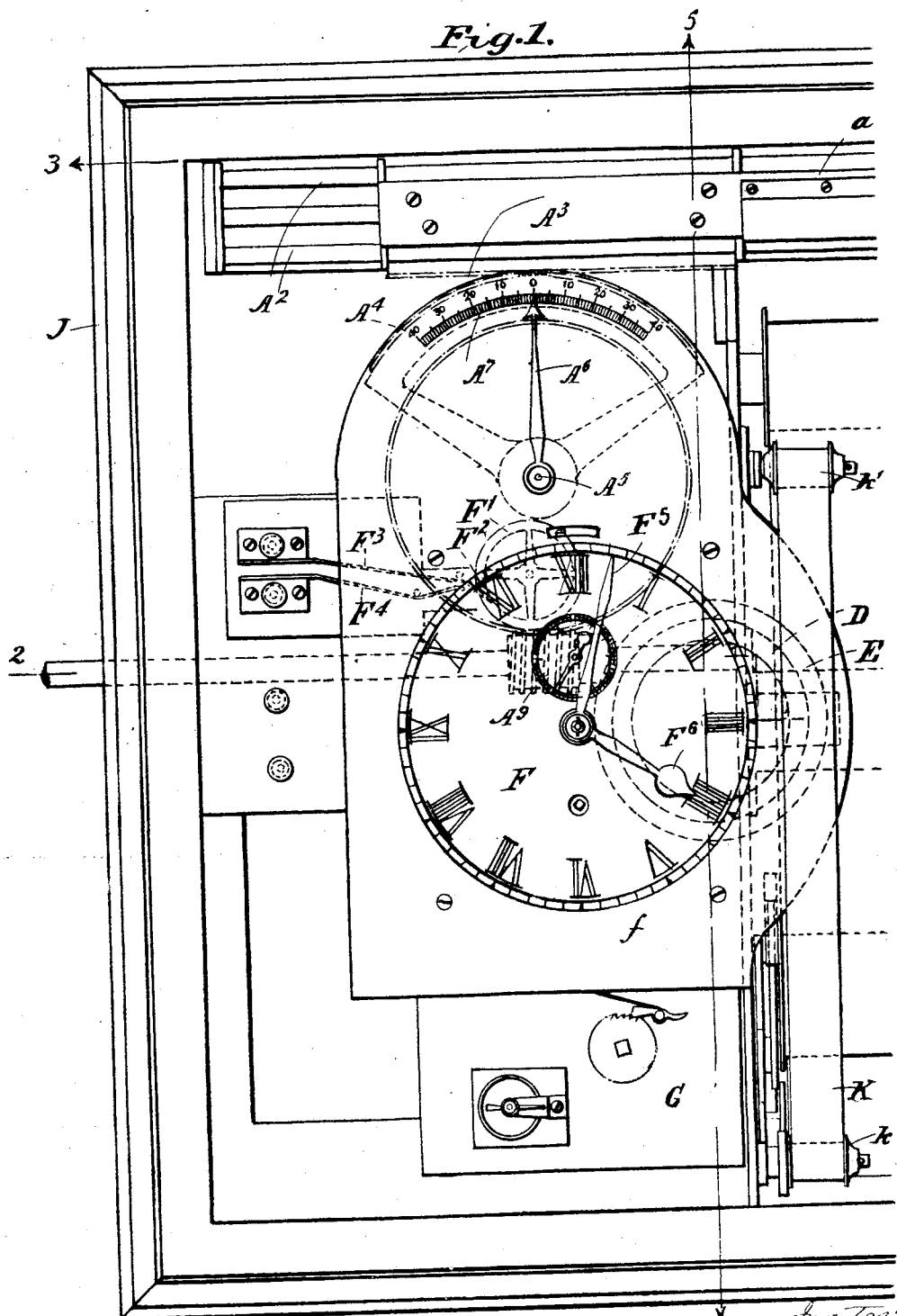
Figure 7:
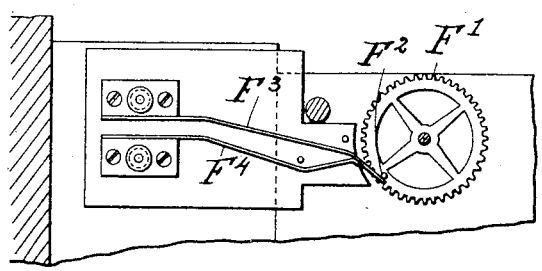
Figure 8:
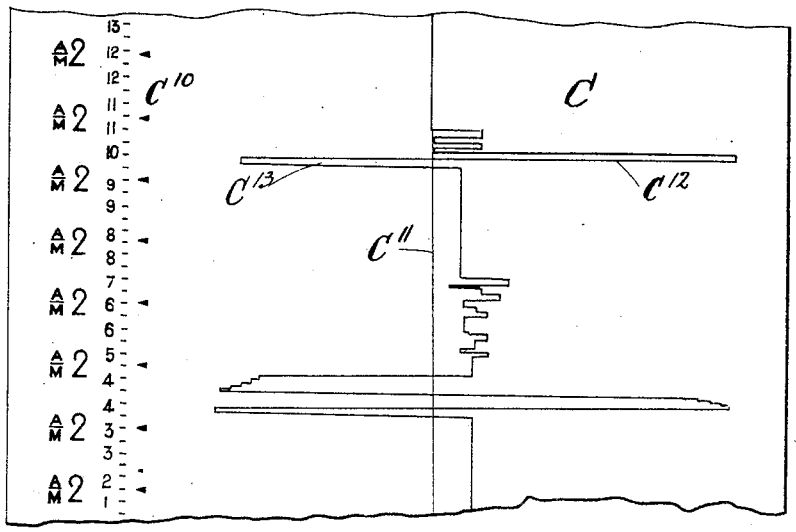

Referring to the drawings, Figures 1 and 1$^a$ together form a plan view of the instrument with cover removed; Fig. 2 is a section on line 2—2 Fig. 1 and Fig. 3 is a vertical section on the line 3—3 of Figs. 1, 1$^a$; Fig. 4 is an elevation showing the casing in section; Fig. 5 is a sectional view showing the gearing between the stylus arm and the rudder mechanism and also the mechanism for operating the time printing devices; Fig. 6 is a section on the line 6—6 Fig. 5; Fig. 7 is a plan view of the time circuit closing mechanism, the parts being shown in position to make contact; Fig. 8 is a detail showing a part of the record strip.

A is the stylus or pen operatively connected to a member of the steering gear so that it moves with or proportionately to the helm or rudder and in the same direction which will be hereinafter referred to as the movable member.

B is the hammer by which the recording strip C is forced against the time indicating type.

D and E are the type disks, D being the hour disk and E the minute disk.

F is the clock for operating the disks and G the clock work motor for moving the strip C.

The time indicating and recording mechanism employed in itself does not belong to this invention but forms the subject-matter of our copending application Serial No. 438,662, it however comprises a clock F which imparts motion to disks D, E having characters, figures or the like representing increments of time, in the form of type upon their under surface and which through the medium of an inking ribbon K are caused to impress or print upon the record strip C, the time of some act or movement.

The disks D and E overlap at one side of the record strip C above which is the inking ribbon K so that when the mechanism is operated the paper is carried up against the time indicating characters on the disks and through the medium of the ribbon receives an impress of the time.

A fusee $f'$ carries a toothed wheel $f^2$ gearing with a pinion $f^3$ on a spindle $f^4$, which through any known form of gearing drives both the hour hand $f^6$ and the minute hand $f^5$ of the clock. Gearing with the pinion on the spindle $f^4$ is a pinion $f^7$, on the spindle of which is also mounted a pinion $f^8$ which in turn gears with a pinion D' on the hub of the minute disk E.

Carried by the hub of the minute disk E is a cam D$^2$ upon which bears the end of an arm D$^3$ pivoted to the frame $f$ of the apparatus and controlled by a spring D$^7$. Pivoted on the arm D$^3$ is a pawl D$^4$ maintained in contact with the teeth of a ratchet wheel D$^5$ on the hub of the hour disk D by a spring $d$, and acting against the end of the arm D$^4$ to prevent it from being moved far enough to allow the ratchet wheel to overrun is a stop D$^6$. The cam D$^2$ operates to move the hour disk one division for each revolution of the minute disk, the minute disk being driven from the clock F by the mechanism explained. The arrangement permits, without making the apparatus unduly cumbersome, the employment of an hour disk having a separate character or numeral for each hour of the twenty-four. This time recording mechanism is shown in our copending application referred to.

The stylus or pen A according to the present invention is caused to travel to and fro across the record strip, so that any movement to the right indicates movement of the helm to starboard and movements to the left indicate movement to port. The pen A is geared to the helm through any appropriate mechanism comprising a bar or frame $A^1$ supported in the enclosing casing J upon runners or guides $A^2$ and having teeth $A^3$ adapted to gear with a quadrant $A^4$ mounted upon a spindle $A^5$ and adapted to move through the same number of degrees and to the same extent as the helm or rudder. In other words the movement of the helm say to port moves the stylus to port only and through the same number of degrees. At its lower end the spindle $A^5$ carries a worm wheel $A^8$ with which gears a worm $A^9$ operatively connected through appropriate mechanism with the steering gear or the ship's rudder or helm. This stylus or pen A which is carried by an arm $A^1$ or rod connected to the carrying frame is preferably hinged at $a$ to the rack bar so as to permit of it being turned away from the record strip to permit of access to the latter. In the form shown the stylus has a cup containing suitable ink and has at its lower end a capillary opening through which ink passes to the recording strip C. The stylus and its carriage are arranged to slide freely on the carrying frame.

The recording strip C is carried as shown on a roll $C^1$ and passes above the printing table $J^1$ over which it is drawn by a pair of feed rollers $G^1$ $G^2$, and the used portion is conveniently allowed to collect in a suitable receptacle underneath the casing. The paper strip moves forward continuously and receives its motion from a clockwork or other motor G.

The two feed rolls $G^1$ $G^2$ are positively driven and one $G^1$ is mounted upon a frame $g$ and is geared to the motor G the speed of which can be regulated or adjusted at will. On one end of the motor driven roll $G^1$ is a toothed wheel $G^3$ meshing with a similar wheel $G^4$ on the corresponding end of the other roll $G^2$. The roll $G^2$ is mounted on the upper ends of two pillars $g^1$ pivoted at $g^2$ at the lower end and also controlled by a spring $g^3$ and provided with a regulating stop $g^4$ against which bears an adjustable screw $g^5$ carried by the pillar $g$. This allows a certain relative movement between the rolls and the teeth of these wheels are sufficiently deep to maintain the drive should such relative movement take place in consequence of inequalities or folds in the papers and renders the mechanism automatically adaptable to different thicknesses of paper the screw $G^5$ being used in the latter case to fix the adjustment. The arrangement also provides for the ready positioning of a fresh record strip.

The plunger or hammer B which effects the printing has preferably a rubber, or the like face $b$ and is mounted beneath the printing table $J^1$ which is cut or slotted at the printing point $J^2$ for the passage of the hammer. Preferably this hammer does not act with a direct blow, but is pivoted to an arm $B^1$ carrying it. The arm $B^1$ is fulcrumed at $B^2$ intermediate of its ends, an armature $B^4$ of an electro magnet $B^3$ being mounted on the end opposite to that to which the hammer is pivoted. A spring $b^1$ constantly tends to force hammer down away from the record strip. When the electric circuit is closed the armature $B^4$ is suddenly and momentarily attracted by the magnet through a make and break arrangement hereinafter described and the hammer is thrown up against the paper strip C which is forced together with the inking ribbon, against the type on the disks D and E as aforesaid. Conveniently the hammer is returned by a spring $B^5$.

Referring now to the mechanism for impressing on the record strip the time of the movements recorded thereon by the stylus: The circuit is closed and the time recorded on the strip after the manner above indicated at regular intervals and irrespective of the movements of paper and those of the helm or rudder as recorded by the stylus. A convenient period under ordinary circumstances with the paper travelling slowly is a minute and a half. For this purpose there is provided a wheel $F'$ upon whose rim a pin $F^2$ is mounted and the pin as the wheel rotates acts upon a wiper $F^3$ forming one terminal of the hammer controlling circuit and forces it against a spring $F^4$ forming the other terminal and thereby closing the circuit which is again opened when the pin $F^2$ passes beyond the wiper $F^3$. Wheel $F^1$ is driven from the clock F through a gear $F^5$. If the wheel rotates once in the period named then one pin suffices but the time can be recorded more frequently by placing more pins on the wheel or by adding one or more arms carrying other circuit closing pins.

The recording strip Fig. 8 may have a zero line $C^{11}$ marked along its center so that the travel of the stylus to right or left of the zero is indicative of corresponding degrees of movement of the helm to right $C^{12}$ or left $C^{13}$. That is to say the movement of the stylus from the zero line or from position attained at the completion of the previous movement will indicate the movement in degrees of the vessel's helm or rudder to port or starboard.

$C^{10}$ designates the time marked periodically.

The time indicating and recording disks overlap one edge of the recording strip C as shown in Fig. 1 and between the printing parts of the disks and the strip is interposed an endless inking ribbon K which is carried on rollers $k$ $k$ one or more of which are adjustable to regulate the tension.

With the above described arrangement as the record strip C is moving along continuously the successive periods of time are recorded at regular intervals along one edge of the strip and the stylus will make a line along the zero line of the said strip. When the helm or rudder is actuated, the stylus A will travel to right or left of the zero line according to the direction of motion, so that by a simple calculation, if the record strip as desirable is divided by transverse and longitudinal lines, the direction, extent, and time occupied for each movement of the helm or rudder can be ascertained. The clockwork in addition to being provided with the time indicating and recording disks is also provided with a clock-face and time indicating hands.

The arrangement above described provides for the taking of a permanent record of every movement of the rudder, together with the times of movement and the time taken to execute such movement, indicating the amount of "helm" given in altering course, evolutions, errors in steering a set course, accidents to any part of the steering or controlling mechanism. Further as the strip moves forward continuously and is recorded independently of the movements of the helm the length of time that the helm remains at rest in any position is recorded. The paper is conveniently fed forward by its motors at say half an inch per minute, such speed being calculated to give a clear diagram and this enables the approximate time of any movement or part of a movement to be determined without taking the speed of the paper into account.

In addition to the face of the recording clock, there is provided on or adjacent to the face plate a scale marked with degrees to correspond with the movements of the helm and connected with the spindle $A^5$ is a pointer $A^7$ which agrees in position with the moving part and provides a check for setting and regulating the mechanism.

The used paper passes into a convenient receptacle below the casing and in order that a part of the record may be removed without interfering with the operation of the apparatus or distributing the paper at the recording point and producing a false record, a cutter or guillotine $h$ is provided to enable the record to be cut off clearly, evenly and quickly when required.

The entire apparatus is inclosed in the watertight casing J so that the record may be preserved should the vessel be submerged or sink.

Having thus described our invention what we claim as new and desire to secure by Letters Patent is:

1. In an apparatus for indicating and recording the movements of a ship's helm, the combination of record strip feeding mechanism, a clockwork mechanism having time printing devices, an inking ribbon, a stylus mechanism operatively connecting the stylus with the helm, to cause it to move therewith, mechanism controlled by the clock for bringing the record strip and the time printing devices into printing contact at regular intervals and a motor for continuously moving the record strip feeding mechanism.

2. In an apparatus for indicating and recording the movements of a ship's helm, the combination with a clock having time printing devices one for hours, and one for minutes, of a stylus means positively connecting the stylus with the ship's helm, to move with it, a motor for continuously moving a record strip, a hammer, an electromagnet, controlling the hammer and a make and break mechanism controlled by the clock for periodically bringing the record strip and printing devices into printing contact.

3. In an apparatus for indicating and recording the movements in direction, extent, and time of a ship's helm, the combination of a clock having time printing devices, two feed rollers for a record strip, a motor for continuously driving the feed rolls, a stylus, an arm carrying the stylus, a rack on the arm, a quadrant gearing with the rack and positively connected to the ship's steering gear to move the stylus in the same relation as the ship's helm, and means controlled by the clock for periodically bringing the time printing devices and the record strip into printing contact.

4. In an apparatus for indicating and recording the movements, in direction extent and time of a ship's helm, the combination with a clock having time printing devices, and a hammer, of an electromagnet, controlling the hammer, a circuit closer controlled by the clock for periodically causing the hammer to bring a record strip into printing contact with the printing devices, feed rolls geared together for the record strip, means whereby the rolls can move relatively to one another while in gear, a motor for the feed rolls, a stylus adapted to bear on the record strip and means positively connecting the stylus with the ship's helm.

5. In an apparatus for indicating and recording the movements in direction, extent and time of a ship's helm, the combination of a clock, time printing hour and minute devices driven from the clock, a levered hammer, an electromagnet connected with the hammer lever an electric circuit for the magnet a circuit closer, mechanism driven by the clock to periodically force the hammer against a record strip and the record strip against the printing devices, a stylus, an arm carrying the stylus, a rack on the arm, guides for the rack a quadrant gearing with the rack, mechanism positively connecting the quadrant with the ship's helm, to move in the same relation as it, feed roll for the record strip, a second feed roll for the strip, a pivoted frame carrying the second roll, gearing connecting the two rolls and a motor driving one of the rolls continuously.

6. In an apparatus for indicating and recording the movements in direction extent, and time of a ship's helm, the combination of a clock, time printing hour and minute disks driven from the clock, a levered hammer a pivot between the hammer and its lever, a spring bearing on the hammer, a second spring acting upon the hammer lever, an electromagnet connected with the hammer lever, an electric circuit for the magnet, a circuit closer, mechanism driven by the clock to periodically force the hammer against a record strip and the record strip against the printing disks, a stylus, an arm carrying the stylus, a rack on the arm, guides for the rack a quadrant gearing with the rack mechanism positively connecting the quadrant with the ship's helm to move in the same relation as it, feed roll for the record strip, a second feed roll for the strip, a pivoted frame carrying the second roll, gearing connecting the two rolls and a motor driving one of the rolls continuously.

7. In an apparatus for indicating and recording the movements in direction extent, and time of a ship's helm, the combination of a clock, time printing hour and minute disks driven from the clock, a table supporting a record strip and having an opening for the passage of a hammer, a levered hammer, a pivot between the hammer and its lever a spring bearing on the hammer, a second spring acting upon the hammer lever, an electromagnet connected with the hammer lever, an electric circuit for the magnet, a circuit closer, mechanism driven by the clock to periodically force the hammer against the record strip and the record strip against the printing disks, a stylus, an arm carrying the stylus, a rack on the arm, guides for the rack a quadrant gearing with the rack mechanism positively connecting the quadrant with the ship's helm to move in the same relation as it, feed roll for the record strip, a second feed roll for the strip, a pivoted frame carrying the second roll, gearing connecting the two rolls and a motor driving one of the rolls continuously.

8. In an apparatus for indicating and recording the movements in direction extent, and time of a ship's helm, the combination of a clock, time printing hour and minute disks driven from the clock, a table supporting a record strip and having an opening for the passage of a hammer, a levered hammer, a pivot between the hammer and its lever a spring bearing on the hammer, a second spring acting upon the hammer lever, an electromagnet connected with the hammer lever, an electric circuit for the magnet, a circuit closer, mechanism driven by the clock to periodically force the hammer against the record strip and the record strip against the printing disks, a stylus, an arm carrying the stylus, a rack on the arm, guides for the rack a quadrant gearing with the rack mechanism positively connecting the quadrant with the ship's helm to move in the same relation as it, feed roll for the record strip, a second feed roll for the strip, a pivoted frame carrying the second roll, gearing connecting the two rolls and a motor driving one of the rolls continuously, a water tight inclosing casing for the mechanism, and a cutting device for the used strip fixed at an outlet from the casing.

9. In an apparatus for indicating and recording the movement of a ship's helm, the combination with mechanism for continuously feeding a record strip, of a stylus movable transversely of the line of movement of the strip and operatively connected to the helm, and time recording means independent of the helm and operating to print the time on the strip at regular intervals.

10. In an apparatus of the class described, the combination with mechanism for continuously feeding a record strip, of a stylus movable transversely of the line of movement of the strip, time recording means operating to print the time on the strip, a toothed slide supporting the stylus, and a meshing quadrant for moving the slide.

11. In an apparatus for indicating and recording the movement of a ship's helm, the combination with mechanism for continuously feeding a record strip, of a stylus movable transversely of the line of movement of the strip, time recording means independent of the helm and operating to print the time on the strip at regular intervals, a toothed slide supporting the stylus, and a meshing quadrant operatively connected to the ship's helm.

12. In an apparatus of the class described, the combination with mechanism for continuously feeding a record strip, of a stylus movable transversely of the line of movement of the strip, time recording means operating to print the time on the strip, a toothed slide supporting the stylus, a meshing quadrant for moving the slide, a pointer mounted on the quadrant center, and a scale coöperating with the pointer.

In testimony whereof we have signed our names to this specification in the presence of two subscribing witnesses.

F. M. RUSSELL.
A. J. JUNG.

Witnesses:
H. D. JAMESON,
WM. J. DOW.